United States Patent Office 3,011,994
Patented Dec. 5, 1961

3,011,994
POLYESTERS WITH IMPROVED ADHESION
TO GLASS
Richard E. Davies, Ridgewood, N.J., and Leonard J. Rosen, Pasadena, Calif., assignors to Celanese Corporation of America, New York, N.Y., a corporation of Delaware
No Drawing. Filed Oct. 15, 1957, Ser. No. 690,190
22 Claims. (Cl. 260—40)

This invention relates to polyester compositions and to processes utilizing polyester compositions. In particular it relates to polyesters having improved adhesion to glass and to processes utilizing such polyesters to produce laminates of superior physical properties.

Linear unsaturated polyester resins prepared by reacting a dihydric alcohol with an ethylenically unsaturated dicarboxylic acid are known to be useful in the production of cured resins by reaction with styrene, or a similar monomer, and known to be useful in the production of glass filled laminates when such reactions are carried out in intimate contact with glass fibers. It is also known that better laminates may be prepared by including a glycidyl acrylate or methacrylate in the reactant mixture to produce better bonding to the glass fibers.

It is an object of this invention to provide novel polyester compositions capable of producing laminates superior in flexural strength to those heretofore known.

It is a further object of this invention to provide novel polyester compositions which produce laminates of optimum physical properties with lower proportions of expensive comonomers than the compositions heretofore used for optimum physical properties.

It is a further object of this invention to provide novel processes for producing laminates of excellent physical properties.

It is still another object of this invention to produce novel resinous laminates of excellent flexural strength.

These and other objects are achieved by preparing a composition of matter comprising a linear unsaturated polyester resin prepared by reacting a dihydric alcohol with an ethylenically unsaturated dicarboxylic acid, an unsaturated liquid solvent for said unsaturated polyester resin which is also a reactant therewith, such as styrene, alkyl substituted styrenes, halogen substituted styrenes or unsaturated esters and a glycidyl ether of an unsaturated aliphatic alcohol.

The unsaturated polyester resins used in accordance with this invention are those produced by the reaction of dihydric alcohols with ethylenically unsaturated dicarboxylic acids. Among the dihydric alcohols which may be used are ethylene glycol, propylene glycol, neopentyl glycol, diethylene glycol, dipropylene glycol, 2,2 bis halomethyl 1,3 propanediol or butanediol. Among the ethylenically unsaturated dicarboxylic acids which may be used are maleic acid, fumaric acid, aconitic acid, itaconic acid, chlormaleic acid or dichlormaleic acid. Anhydrides of ethylenically unsaturated dicarboxylic acids may be used when available and are included within the scope of the term "ethylenically unsaturated dicarboxylic acid" as used herein. If desired dicarboxylic acids, free of non-benzenoid unsaturation, or anhydrides thereof, may be used to replace a portion of the ethylenically unsaturated dicarboxylic acids, provided that the replacement is not to the extent where there is insufficient ethylenic unsaturation in the polymer to permit copolymerization with the reactant liquid solvent, such as styrene. Among the dicarboxylic acids, free of non-benzenoid unsaturation which may be used are phthalic acid, sebacic acid, malonic acid, succinic acid, glutaric acid, isophthalic acid, adipic acid, azelaic acid and diglycolic acid. Among the preferred specific polyesters which may be used are the reaction product of 1,2 propylene glycol, with phthalic anhydride and maleic anhydride.

The unsaturated polyester resin is in solution in an unsaturated liquid solvent which is also a reactant, or comonomer therewith. The preferred unsaturated liquid solvent is styrene. Alkyl substituted styrenes and halogen substituted styrenes such as ortho methyl styrene, ortho chloro styrene, meta ethyl styrene, para butyl styrene, 2,4-dichlorostyrene, 2,5-dichlorstyrene, alpha methyl styrene may also be used. Ethylenically unsaturated esters such as vinyl acetate, methyl acrylate, methyl methacrylate, diallyl phthalate, ethyl acrylate, diethyl itaconate, diallyl fumarate and triallyl cyanurate may also be used, alone or in admixture with each other, or with styrene or a modified styrene. The liquid solvent reactant, such as styrene, is generally included in proportions varying from about 10 to about 90 parts based on 100 parts of blended resin. Preferably the proportion is between about 20 and about 50 parts per 100 parts of blended resin.

The glycidyl ether of an unsaturated aliphatic alcohol is preferably one having an alkenyl radical containing from 2 to 4 carbon atoms and most preferably allyl 2,3-glycidyl ether. Other glycidyl ethers which may be used are vinyl glycidyl ether, and methallyl glycidyl ether. If desired, mixtures containing two or more glycidyl ethers may be used. The glycidyl ether is generally included in proportions ranging from about 25 to about 50 mole percent, of the total unsaturated monomer and preferably between about 10 and about 70 mole percent. Complete, or substantially complete replacement of styrene, or equivalent, by the glycidyl ether produces laminates which are too soft. The total parts of styrene, or equivalent and glycidyl ether is from about 10 to about 65 parts per 100 parts of blended resin.

The glass fibers used may be in the form of individual fibers of filaments or may be in the form of strands, mats or cloth.

The resinous compositions are cured in the presence of a suitable catalyst such as an organic peroxy compound. The peroxy compound may be an alkyl or aralkyl hydro peroxide, a dialkyl or diaralkyl peroxide, a peroxy acid, a peroxy ester, a diacyl or diaroyl peroxide, or the various mixed diperoxides and hydroperoxides formed by the action of hydrogen peroxides on ketones. Among the specific peroxy compounds which may be used are cyclohexanone peroxide, benzoyl peroxide, t-butyl perbenzoate, t-butyl hydroperoxide and lauroyl peroxide.

Laminates are prepared by applying the aforementioned admixture to one or more layers of glass fiber mats or glass fiber fabric and curing at a contact pressure between substantially atmospheric to about 100 p.s.i. Contact pressures between about atmospheric and about 50 p.s.i. are preferred.

Example I

This example is typical of the prior art, wherein glycidyl methacrylate replaces a portion of the styrene in a standard polyester-styrene formulation to improve adhesion to glass.

An unsaturated polyester resin was prepared by reacting 50 mole percent of phthalic anhydride and 50 mole percent of maleic anhydride with a 10 percent molar excess of 1,2-propylene glycol until the resin had an acid number of about 50. The excess propylene glycol was distilled off leaving a solid, hard, brittle unsaturated polyester base resin which could be readily crushed and which was stable in storage.

Two solutions were prepared from the above-described base resin, one containing 0.518 mole of styrene and 0.0 mole of glycidyl methacrylate per 100 grams of base resin and the second containing 0.259 mole of styrene and 0.259 mole of glycidyl methacrylate per 100 grams of base resin. Both solutions were catalyzed by 2% by weight of benzoyl peroxide paste (equivalent to 1% on pure basis) and used in the preparation of laminates, as described below.

*Example II*

This example illustrates the present invention, wherein glycidyl 2,3-allyl ether replaces a portion of the styrene in a standard polyester-styrene formulation to improve adhesion to glass.

Two solutions were prepared from the base resin, described above, one containing 0.518 mole of styrene and 0.0 mole of glycidyl allyl ether per 100 grams of base resin, the other containing 0.389 mole of styrene and 0.130 mole of glycidyl allyl ether per 100 grams of base resin. Both solutions were catalyzed by 2% t-butyl perbenzoate, a catalyst having a longer half-life than benzoyl peroxide at the temperature necessary to cure glycidyl 2,3-allyl ether.

Each of the aforementioned solutions was used to prepare a laminate with six parallel plies of heat-treated satin weave glass fabrics. In the case of the first two solutions (of Example I) the impregnated six plies were put under contact pressure, heated to 110° C., maintained there for 10 minutes, and then cooled to 45° C. while still in the press and removed. In the case of the latter two solutions (of Example II) the residence time at 110° C. was extended to 30 minutes and a post-curing treatment at atmospheric pressure and 120° C. was maintained for 24 hours.

All of the laminates were cut into test pieces of approximately 0.5 x 5" size. The samples to be dry tested were conditioned for 48 hours at 50% relative humidity and 73.4° F. and the samples to be wet tested were immersed in water for seven days under similar conditions of room temperature and humidity. The flexural testing conformed to A.S.T.M. D650-42T (modified); the range being 240 lbs. and the span depth ratio being 16-18 to 1.

The flexural strength test results were as follows:

| Solution | Styrene | Glycidyl Methacrylate | Glycidyl Allyl Ether | Dry Strength | Wet Strength |
|---|---|---|---|---|---|
| 1 | 0.518 | | | 54,500 | 28,000 |
| 2 | 0.259 | 0.259 | | 59,000 | 34,000 |
| 3 | 0.518 | | | 53,000 | 29,000 |
| 4 | 0.389 | | 0.130 | 75,000 | 65,000 |

It may be seen that solutions 1 and 3 with no substitution for styrene were substantially identical in the flexural strength of the laminates produced despite the difference in catalyst and the difference in curing procedure. On the other hand, a comparison of the laminates produced from solutions 2 and 4 shows that the substitution of glycidyl allyl ether for styrene produces a much greater improvement in flexural strength than the substitution of an even greater quantity of glycidyl methacrylate.

It is to be understood that the foregoing detailed description is merely given by way of illustration and that many variations may be made therein without departing from the spirit of our invention.

Having described our invention, what we desire to secure by Letters Patent is:

1. A composition of matter comprising an ethylenically unsaturated linear polyester resin, an unsaturated liquid solvent for said unsaturated polyester resin which is also a reactant therewith and which is selected from the group consisting of styrene, alkyl substituted styrenes, halogen substituted styrenes, vinyl acetate, methyl acrylate, methyl methacrylate, diallyl phthalate, ethyl acrylate, diethyl itaconate, diallyl fumarate, triallyl cyanurate and mixtures thereof, and a glycidyl ether of an unsaturated aliphatic alcohol having 2 to 4 carbon atoms, the mol ratio of said unsaturated liquid solvent to said glycidyl ether being between about 10 to 1 and about 1 to 2.

2. A composition of matter comprising an ethylenically unsaturated linear polyester resin, styrene and glycidyl 2,3-allyl ether, the mol ratio of said styrene to said glycidyl ether being about 10 to 1 and about 1 to 2.

3. A composition of matter comprising from about 35 to about 90 parts by weight of an ethylenically unsaturated linear polyester resin, and from about 65 to about 10 parts by weight of a mixture of styrene and glycidyl 2,3-allyl ether in which the mol ratio of styrene to glycidyl 2,3-allyl ether is between about 10 to 1 and about 1 to 2.

4. A composition of matter comprising from about 50 to about 70 parts by weight of an ethylenically unsaturated linear polyester resin, and from about 50 to about 30 parts by weight of a mixture of styrene and glycidyl 2,3-allyl ether in which the mol ratio of styrene to glycidyl 2,3-allyl ether is between about 7 to 1 and about 3 to 1.

5. A composition of matter comprising an ethylenically unsaturated linear polyester resin, an unsaturated liquid solvent for said unsaturated polyester resin which is also a reactant therewith, and which is selected from the group consisting of styrene, alkyl substituted styrenes, halogen substituted styrenes, vinyl acetate, methyl acrylate, methyl methacrylate, diallyl phthalate, ethyl acrylate, diethyl itaconate, diallyl fumarate, triallyl cyanurate and mixtures thereof, a glycidyl ether of an unsaturated aliphatic alcohol having 2 to 4 carbon atoms, and glass fibers, the mol ratio of said unsaturated liquid solvent to said glycidyl ether being between about 10 to 1 and about 1 to 2.

6. A composition of matter comprising from about 35 to about 90 parts by weight of an ethylenically unsaturated linear polyester resin, from about 65 to about 10 parts by weight of a mixture of styrene and glycidyl 2,3-allyl ether in which the mol ratio of styrene to glycidyl 2,3-allyl ether is between about 10 to 1 and about 1 to 2, and glass fibers.

7. A composition of matter comprising an ethylenically unsaturated linear polyester resin, styrene, glycidyl 2,3-allyl ether, and an organic peroxy compound, the mol ratio of said styrene to said glycidyl ether being about 10 to 1 and about 1 to 2.

8. A composition of matter comprising an ethylenically unsaturated linear polyester resin, styrene, glycidyl 2,3-allyl ether, an organic peroxy compound, and glass fibers, the mol ratio of said styrene to said glycidyl ether being about 10 to 1 and about 1 to 2.

9. A process comprising bringing glass fibers into intimate contact with an ethylenically unsaturated linear polyester resin, an unsaturated liquid solvent for said unsaturated polyester resin which is also a reactant therewith and which is selected from the group consisting of styrene, alkyl substituted styrenes, halogen substituted styrenes, vinyl acetate, methyl acrylate, methyl methacrylate, diallyl phthalate, ethyl acrylate, diethyl itaconate, diallyl fumarate, triallyl cyanurate and mixtures thereof and a glycidyl ether of an unsaturated aliphatic alcohol having 2 to 4 carbon atoms, and thereafter curing the thus formed admixture, the mol ratio of said unsaturated liquid solvent to said glycidyl ether being between about 10 to 1 and about 1 to 2.

10. A process comprising bringing glass fibers into intimate contact with an ethylenically unsaturated linear polyester resin, styrene and glycidyl 2,3-allyl ether and thereafter curing the thus formed admixture, the mol ratio of said styrene to said glycidyl ether being between about 10 to 1 and about 1 to 2.

11. A process comprising bringing glass fibers into intimate contact with a polyester mixture comprising from about 35 to about 90 parts by weight of an ethylenically unsaturated linear polyester resin, and from about 65 to about 10 parts by weight of a comonomer mixture of styrene and glycidyl 2,3-allyl ether, said comonomer mix- 12. A process comprising bringing glass fibers into intimate contact with a polyester mixture comprising from about 35 to about 90 parts by weight of an ethylenically unsaturated linear polyester resin, and from about 65 to about 10 parts by weight of a comonomer mixture of styrene and glycidyl 2,3-allyl ether, said comonomer mixture having a mol ratio of styrene to glycidyl 2,3-allyl ether between about 10 to 1 and about 1 to 2 in the presence of an organic peroxy compound, and thereafter curing the thus obtained admixture.

13. A process comprising bringing glass fibers into intimate contact with a polyester mixture comprising from about 50 to about 70 parts by weight of an ethylenically unsaturated linear polyester resin, and from about 50 to about 30 parts by weight of a comonomer mixture of styrene and glycidyl 2,3-allyl ether, said comonomer mixture having a mol ratio of styrene to glycidyl 2,3-allyl ether between about 7 to 1 and about 3 to 1, in the presence of an organic peroxy compound and thereafter curing the thus obtained admixture.

14. A process comprising bringing a glass fiber mat into intimate contact with a polyester mixture comprising from about 50 to about 70 parts by weight of an ethylenically unsaturated linear polyester resin, and from about 50 to about 30 parts by weight of a comonomer mixture of styrene and glycidyl 2,3-allyl ether, said comonomer mixture having a mol ratio of styrene to glycidyl 2,3-allyl ether between about 7 to 1 and about 3 to 1, and thereafter curing the thus obtained admixture.

15. A process comprising bringing a glass fiber fabric into intimate contact with a polyester mixture comprising from about 50 to about 70 parts by weight of an ethylenically unsaturated linear polyester resin, and from about 50 to about 30 parts by weight of a comonomer mixture of styrene and glycidyl 2,3-allyl ether, said comonomer mixture having a mol ratio of styrene to glycidyl 2,3-allyl ether between about 7 to 1 and about 3 to 1, and thereafter curing the thus obtained admixture.

16. A product comprising glass fibers in intimate contact with a cured reaction product of an ethylenically unsaturated linear polyester resin, an unsaturated liquid solvent for said unsaturated polyester resin which is also a reactant therewith and which is selected from the group consisting of styrene, alkyl substituted styrenes, halogen substituted styrenes, vinyl acetate, methyl acrylate, methyl methacrylate, diallyl phthalate, ethyl acrylate, diethyl itaconate, diallyl fumarate, triallyl cyanurate and mixtures thereof and a glycidyl ether of an unsaturated aliphatic alcohol having 2 to 4 carbon atoms, the mol ratio of said unsaturated liquid solvent to said glycidyl ether being between about 10 to 1 and about 1 to 2.

17. A product comprising a glass fiber mat in intimate contact with an ethylenically unsaturated linear polyester resin, styrene and glycidyl allyl ether, the mol ratio of said styrene to said glycidyl ether being between about 10 to 1 and about 1 to 2.

18. A product comprising a glass fiber fabric in intimate contact with an ethylenically unsaturated linear polyester resin, styrene and glycidyl allyl ether, the mol ratio of said styrene to said glycidyl ether being between about 10 to 1 and about 1 to 2.

19. In the process in which a polyester mixture comprising a solution of about 50 to 70 parts of a dihydric alcohol-dicarboxylic acid polyester resin, said dicarboxylic acid comprising an ethylenically unsaturated dicarboxylic acid, in about 50 to 30 parts of liquid solvent comonomer is mixed with glass fibers and cured in the presence of an organic peroxy curing catalyst, the improvement which comprises using as the comonomer a mixture comprising glycidyl 2,3-allyl ether and 3 to 7 parts of styrene per part of said ether.

20. Process as set forth in claim 19 in which the polyester resin is a reaction product of 1,2 propylene glycol, phthalic anhydride and maleic anhydride.

21. A composition of matter comprising from about 35 to about 90 parts by weight of an ethylenically unsaturated linear polyester resin, an unsaturated liquid solvent for said unsaturated polyester resin which is also a reactant therewith and which is selected from the group consisting of styrene, alkyl substituted styrenes, halogen substituted styrenes, vinyl acetate, methyl acrylate, methyl methacrylate, diallyl phthalate, ethyl acrylate, diethyl itaconate, diallyl fumarate, triallyl cyanurate and mixtures thereof, and a glycidyl ether of an unsaturated aliphatic alcohol having 2 to 4 carbon atoms, the mol ratio of said unsaturated liquid solvent to said glycidyl ether being between about 10 to 1 and about 1 to 2, said unsaturated liquid solvent and said glycidyl ether being present in a total of from about 65 to about 10 parts by weight, the mol ratio of said unsaturated liquid solvent to said glycidyl ether being between about 10 to 1 and about 1 to 2.

22. A process comprising bringing glass fibers into intimate contact with from about 35 to about 90 parts by weight of an ethylenically unsaturated linear polyester resin, an unsaturated liquid solvent for said unsaturated polyester resin which is also a reactant therewith and which is selected from the group consisting of styrene, alkyl substituted styrenes, halogen substituted styrenes, vinyl acetate, methyl acrylate, methyl methacrylate, diallyl phthalate, ethyl acrylate, diethyl itaconate, diallyl fumarate, triallyl cyanurate and mixtures thereof, and a glycidyl ether of an unsaturated aliphatic alcohol having 2 to 4 carbon atoms, and thereafter curing the thus formed admixture, said unsaturated liquid solvent and said glycidyl ether being present in a total of from about 65 to about 10 parts by weight, the mol ratio of said unsaturated liquid solvent to said glycidyl ether being between about 10 to 1 and about 1 to 2.

References Cited in the file of this patent

UNITED STATES PATENTS

| | | |
|---|---|---|
| 2,537,949 | Adams | Jan. 16, 1951 |
| 2,599,817 | Evans et al. | June 10, 1952 |
| 2,602,037 | Nelb | July 1, 1952 |
| 2,627,297 | Faelten | Feb. 3, 1953 |
| 2,723,971 | Cupery | Nov. 15, 1955 |

OTHER REFERENCES

"Polyesters," page 169, published by Reinhold Pub. Corp., New York, N.Y.